Nov. 13, 1951 R. A. VON BEHREN 2,574,898

ELECTROMAGNETIC TRANSDUCER HEAD ASSEMBLY

Filed Dec. 6, 1947

Inventor
ROBERT A. VON BEHREN by The Firm of Charles W. Hills Attys.

Patented Nov. 13, 1951 2,574,898

UNITED STATES PATENT OFFICE 2,574,898

ELECTROMAGNETIC TRANSDUCER HEAD ASSEMBLY

Robert A. von Behren, Valparaiso, Ind., assignor to The Indiana Steel Products Company, Chicago, Ill., a corporation of Indiana Application December 6, 1947, Serial No. 790,127

6 Claims. (Cl. 179—100.2)

My invention relates to an electromagnetic transducer head assembly for magnetic recorders.

In one method of recording an intelligence for future reproduction the magnetic condition of a lengthy magnetizable medium is varied along its length in accord with the time variations of the intelligence to be recorded. To accomplish this, the lengthy medium is drawn across an electromagnetic transducer head having an air gap over which a time varying magnetomotive force is impressed, thereby to impart to each incremental length of the medium a degree of magnetization determined by the intensity of the magnetic field at the particular instant it passes thereover. During the reproducing operation, the magnetic medium is drawn across the transducer head to set up a flux in the core portion thereof varying in accord with the degree of magnetization of each incremental length of the medium as it is drawn thereover, thereby inducing a voltage in a suitable pick-up coil linking the flux, which voltage may be amplified to reproduce the intelligence in its original form such as, for example, sound waves.

To achieve most effective recording and reproduction of an intelligence by means of a lengthy magnetizable medium, it is necessary that the medium be drawn in predetermined manner across the recording head. In the case of relatively wide magnetic mediums such as, for example, a paper tape coated with magnetizable particles, this requires that the transducer head be maintained in accurate alignment with the direction of motion of the medium. This avoids the distortion that otherwise occurs if the axis of the head is tilted relative to the direction of movement of the medium. It is further highly desirable that the head be readily replaceable in the complete recording and reproducing unit and that it be magnetically shielded from surrounding magnetic disturbances such as, for example, the stray alternating field associated with the presence of an alternating current motor or a power transformer in the mechanism.

Since the electromagnetic transducer head assembly of the present invention may be used in apparatus for magnetic recording, magnetic reproducing, or which is operable to accomplish both of these functions, I use the term "magnetic recorder" herein to designate apparatus to accomplish any or all of these functions.

It is accordingly a general object of the present invention to provide an improved electromagnetic transducer head construction for a magnetic recorder.

Further it is an object of the present invention to provide an improved electromagnetic transducer head assembly that may be accurately aligned relative to the direction of motion of the lengthy magnetizable medium to achieve a maximum degree of fidelity of recording and reproduction.

Another object of the present invention is to provide an improved electromagnetic transducer head assembly incorporating adjusting elements to tilt the axis thereof relative to the support structure.

It is another object of the present invention to provide an improved electromagnetic transducer head assembly for a magnetic recorder and which may be received in a suitable socket provided for the purpose.

Yet another object of the present invention is to provide an improved electromagnetic transducer head assembly for a magnetic recorder which is shielded to prevent hum associated with stray magnetic fields.

It is yet another object of the present invention to provide an improved electromagnetic transducer head assembly having both low impedance and high impedance windings.

My invention further resides in features of construction, combination and arrangement whereby an improved head assembly for a magnetic recorder is provided and which is simple in construction and inexpensive in manufacture to the end that a unit of maximum utility is achieved.

The novel features which I believe to be characteristic of my invention are set forth with particularity in the appended claims. My invention, itself, however, both as to its organization and method of operation, together with further objects and advantages thereof, may best be understood by reference to the following description taken in connection with the accompanying drawing in which:

Figures 1, 2, 3, 4, 5, 6, 7, 8:
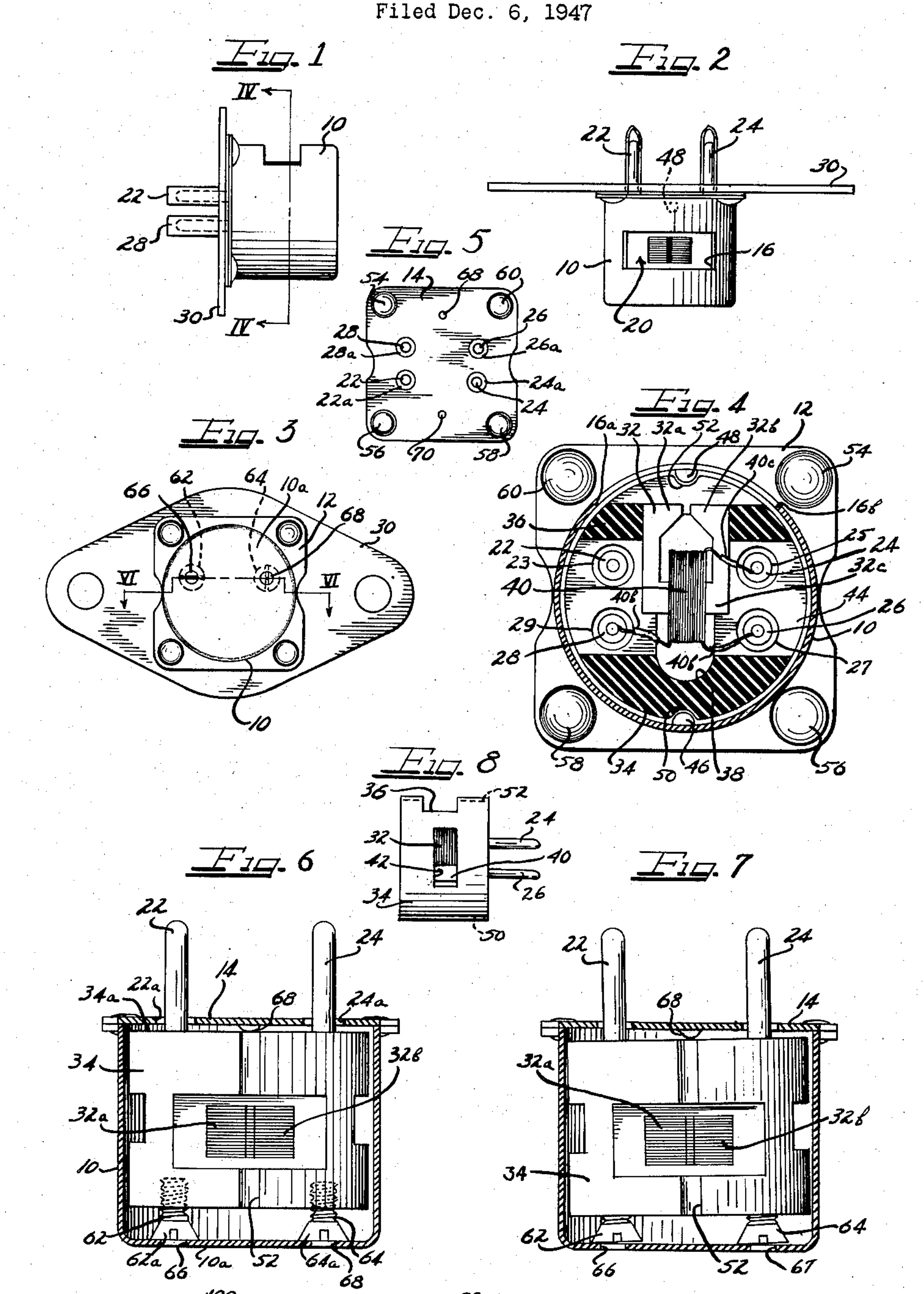
Figure 1 is a side elevational view of an electromagnetic transducer head assembly constructed in accordance with the principles of the present invention and inserted in a suitable socket.
Figure 2 is a top plan view of the mechanism of Figure 1.
Figure 3 is an end elevational view of the structure of Figure 1.
Figure 4 is a greatly enlarged cross sectional view through the axis IV—IV, of Figure 1 and showing only the electromagnetic transducer head assembly.
Figure 5 is a view of the electromagnetic transducer head assembly shown in Figures 1 to 4 as seen from the end opposite the end seen in Figure 3.
Figures 6 and 7 are greatly enlarged views like Figure 2 but with the housing portion broken away along the cross section VI—VI, Figure 3 to show more clearly the elements disposed therein.
Figure 8 is a view showing the electromagnetic transducer head with the housing removed.

As shown in Figures 1, 2, 3 and 5, the improved electromagnetic transducer head assembly of the present invention includes a cup shaped housing portion 10 having a lower square flange portion 12 which receive the bottom plate 14. The housing 10 contains a rectangular window 16, Figure 2, through which the operative elements indicated generally at 20 may be seen. Prongs 22, 24, 26 and 28 extend through the bottom plate 14 to be received by a suitable socket 30. Suitable openings 22*a*, 24*a*, 26*a*, and 28*a* are formed in the bottom plate 14 to receive the prongs 22, 24, 26, and 28, these openings being somewhat larger than the prongs to avoid short circuiting through the plate 14.

In the preferred embodiment of the present invention, the prongs 22, 24, 26, and 28 are spaced relative to each other to fit in the conventional "octal" type radio tube socket. Since sockets of this type are readily available at small cost and may easily be mounted in the panel portion of a magnetic recorder, a simple and effective method of interchangeably supporting the head assembly is thereby provided.

The construction of the elements 20 disposed within the housing 10 may best be understood by reference to the cross sectional view of Figure 4, together with the view of Figure 6 which is like Figure 2 but has the housing portions broken away. As will be evident from these figures, a U-shaped laminated magnetic core 32 is positioned within the housing 10 with its opposed poles 32*a* and 32*b* in alignment with the edges 16*a* and 16*b* of the window 16. This core is received in a cylindrical block 34 made of insulating material such as, for example, a phenol formaldehyde condensation product. As is best seen in the views of Figures 4 and 8, the block 34 is cut away to form a flat face portion 36 extending between the edges 16*a* and 16*b* of the window 16 and which is in alignment with the pole pieces 32*a* and 32*b* of the head 32. Moreover, the insert 34 has an elongated slot 38 extending therethrough in the direction of the prongs 22 to 28 and which is in alignment with the bottom leg 32*c* of the core 32 to receive the coil 40 which is wound about that portion of the core 32. A rectangular opening 42 extends transversely of the elongated opening 38 as seen in the view of Figure 8. This opening defines the surface 44 disposed parallel to the plane of the socket 30.

As shown in Figure 4 openings 23, 25, 27 and 29 are formed in the surface 44 of the block 34 to receive the pins 22, 24, 26 and 28 respectively. The wires 40*a*, 40*b* and 40*c* leading from the coil 40 are soldered into three of these pins, as, for example, pins 28, 26 and 24, respectively. The corresponding prongs of the socket 30 are connected to the portions of the magnetic recorder to which the coil 40 is desired to be connected.

The cylindrical block 34 is sustained in aligned relationship relative to the window 16 of the housing 10 by the diametrically opposite inwardly extending tits 46 and 48 of the housing 10. These tits form dome-shaped portions which are received in the slots 50 and 52 of the member 34. These slots are formed in the opposed diametrical portions of the block 34 and are aligned with the prongs 22 to 28 to permit the member 34 to be received in the housing 10 only if the surface 36 and the opposed pole pieces 32*a* and 32*b* are in alignment with the edge portions 16*a* and 16*b* of the window 16.

The block 34 is held within the housing 10 by the bottom plate 14 which is best seen in the view of Figure 5. As will be evident from this view, this plate is of substantially square shape with openings 22*a*, 24*a*, 26*a* and 28*a* to receive the pins 22, 24, 26 and 28 respectively, the openings being somewhat larger than the pins to prevent electrical connection between the plate 14 and those pins. The plate 14 is held in position relative to the housing 10 by the rivets 54, 56, 58 and 60.

At the end opposite the prongs 22, 24, 26 and 28, the block 34 has a pair of threaded cavities to receive the adjusting screws 62 and 64. These openings are positioned on opposite sides of the plane defined by the grooves 50 and 52 so that the flat head portions 62*a* and 64*a* of the screws 62 and 64 bear against the end portion 10*a* of the cup-shaped housing 10 on opposite sides of this plane and thereby tend to tilt the block 34. As is best seen in Figure 3, the top 10*a* of the housing 10 has a pair of spaced openings 66 and 67 in alignment with the screws 62 and 64 to receive a screw driver or other instrument for adjusting these screws relative to the block 34.

The bottom plate 14 has a pair of cup-shaped tits 68 and 70, Figure 5, extending into the cavity defined by the housing 10 and the plate 14. Tit 68 may be seen in side view in the views of Figures 6 and 7. As will be evident from the view of Figure 5, the tits 68 and 70 are aligned in the plane defined by the grooves 50 and 52, and form an edge about which the block 34 may be tilted. The tits 46 and 48 are positioned close to the flange portion 12 of housing 10 to permit the block 34 to be tilted while at the same time having a snug fit with the grooves 50 and 52.

It is the function of the tits 68 and 70 to hold the bottom end portion 34*a* of the block 34 in spaced relationship with the plate 14 and for limited tilting movement relative thereto. These tilting movements are controlled by the adjustments of the screws 62 and 64 which may be tightened or loosened to tilt the block 34 and thus shift the axis of the air gap between the confronting pole pieces 32*a* and 32*b* relative to the housing 10 and the plane of the socket 30 in which the head is mounted. These shifting or tilting movements may be controlled by suitably adjusting these screws until the air gap is perpendicular to the direction of movement of the medium through the window 16 and across the confronting pole pieces 32*a* and 32*b*. It will be apparent to those skilled in the art that such movement of the block occurs independently of any movement of the housing 10 by reason of the fact that the sockets with which the unit may be associated are substantially all provided with female contact members having a certain amount of give which enable them to adjust themselves to the position of the prongs when the block 34 is adjusted to the path of the record medium which contacts it.

It will be apparent to those skilled in the art that I have provided an improved head for use in magnetic recorders and the like that may readily be manufactured by low cost molding methods, the core portion 32 and the winding 40 being molded into the same block 34 as holds the prongs 22, 24, 26 and 28. The openings 38 and 42 are simultaneously formed in the block 34 in a single molding operation as are the grooves 50 and 52. The cup shaped housing 10 and the closure plate 14 may be drawn out of sheet metal stamped to define the desired shape and the entire assembly may be readily assembled by riveting or other suitable means. While this assembly operation is simple and inexpensive, I have nevertheless provided a head that is accurately aligned relative to the movement of the magnetic record medium through the windows 16 provided to receive the same and in addition may be adjusted to various degrees of tilt relative to the direction of motion of the medium, thereby enabling the air gap between the confronting pole pieces 32a and 32b to be accurately fixed relative to this direction of motion. Moreover, the entire unit may be received in a standard tube socket which may be incorporated in a magnetic recorder to receive different heads as desired.

The cup-shaped housing 10, together with the closure plate 14, is preferably constructed of metal having a high permeability at low flux density. Such metal forms an effective shield against stray magnetic fields about the region in which the unit is disposed inasmuch as the metal itself carries substantially all the magnetic flux in the region of the unit, and a substantial reduction in the flux linkages is achieved. The hum pickup when the unit is mounted in apparatus where stray fields due to alternating current motors, transformers, etc., are encountered is thereby greatly reduced.

The core portion 32 is preferably made of a large number of thin sheets or laminations as indicated in the views of Figures 2, 6 and 7 to reduce to a minimum eddy currents flowing therein. Moreover, the air gap between the confronting pole pieces 32a and 32b is preferably made much smaller than would be apparent from the views of the figures and may, for example, be less than two thousandths of an inch in width, thereby providing a maximum degree of fidelity of recording.

Figure 9:
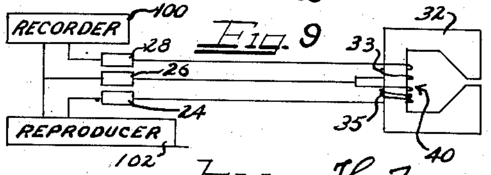
Figure 9 is a schematic circuit diagram of a magnetic recording and reproducing mechanism utilizing the transducer head of the presend invention.

The schematic diagram of Figure 9 shows the core 32 having a coil 40 mounted thereon. This coil may comprise two coaxial portions 33 and 35, Figure 9. The coil 33 has a relatively small number of turns and constitutes a low impedance winding whereas the coil 35 has a relatively great number of turns of low current capacity to form a high impedance winding. As indicated in the diagram, of Figure 9, the common terminal of windings 33 and 35 is connected to the prong 26 whereas the free ends of these windings are connected to prongs 28 and 24, respectively.

The low impedance winding 33 may be connected to suitable low impedance recording or reproducing equipment whereas the high impedance winding 35 may be connected to high impedance equipment. If, for example, it is desired to use the head of the present invention in conjunction with a recorder designed most effectively to operate in conjunction with a low impedance head, that recorder may be connected across the prongs 26 and 28 respectively as indicated by the recorder 100, Figure 9. On the other hand, if a reproducer of the type most effectively operated from a high impedance is used in conjunction with that recorder the reproducer may be connected across the prongs 24 and 26 as indicated by the connection of the reproducer 102, Figure 9. As is well understood by those skilled in the art, it is frequently desirable to use a low impedance recorder in the same magnetic recording and reproducing unit as a high impedance reproducer, since it is desirable to feed the output of the head directly to the grid of an amplifier tube during reproduction and to feed the recording winding from the secondary of an output transformer which is most conveniently a low impedance secondary capable of also being used to feed a dynamic type loudspeaker. Thus by the provision of the two coils in the single head unit a high degree of flexibility is achieved and the unit may be used in a manner not heretofore possible.

It will, of course, be apparent to those skilled in the art that if desired the head of the present invention may be connected to a recorder operable into a high impedance load by connecting the recorder to the prongs 24 and 26 and the reproducer operable from a low impedance source as, for example, by connecting to the terminals 26 and 28.

It will be apparent to those skilled in the art that, if desired, the four terminals of windings 33 and 35 may be brought out to separate prongs 22, 24, 26 and 28 rather than bringing two terminals out to a common prong 26 as shown. This arrangement has the advantage of permitting completely independent connection of the windings.

While I have shown a particular embodiment of my invention, it will of course be understood that I do not wish to be limited thereto since many modifications both in the elements employed and their cooperative structure may be made without departing from the spirit and scope of my invention. I, of course, contemplate by the appended claims to cover any such modifications which fall within the true spirit and scope of my invention.

What I claim as new and desire to secure by Letters Patent in the United States is:

1. An electromagnetic transducer head assembly for a magnetic recorder or the like comprising a cup-shaped housing having a window to receive a lengthy magnetizable medium, a support block in said housing having a grooved portion for alignment with said window to receive said medium for travel in a predetermined direction thereover, a head disposed in said block and having confronting pole pieces defining an air gap and facing said grooved portion. said pole pieces defining an air gap substantially normal to the length of said medium, and means including a pair of members received in said block on opposite sides of the plane normal to said direction and passing through said air gap to rest against the end of said housing and tilt said block to an adjustable position relative to said window.

2. An electromagnetic transducer head assembly for a magnetic recorder or the like comprising a cup-shaped housing having a window to receive a lengthy magnetizable medium, a support block in said housing having a grooved portion for alignment with said window to receive said medium, a head disposed in said block and having confronting pole pieces facing said grooved portion, said pole pieces defining an air gap substantially normal to the length of said medium, said housing having a pair of inwardly extending protuberances in a plane substantially perpendicular to the direction of the length of said medium, said block having a pair of grooves to receive said protuberances, and means including a pair of threaded members received in said block on opposite sides of said plane to rest against the end of said housing and tilt said block to an adjustable position relative to said window, and elements to urge said blocks against the top of said housing.

3. An electromagnetic transducer head assembly for a magnetic recorder or the like comprising a cup-shaped housing having a window to receive a lengthy magnetizable medium, a support block in said housing having a grooved portion for alignment with said window to receive said medium, a head disposed in said block and having confronting pole pieces facing said grooved portion, said pole pieces defining an air gap substantially normal to the length of said medium, said housing having a pair of inwardly extending protuberances in a plane substantially perpendicular to the direction of the length of said medium, said block having a pair of grooves to receive said protuberances, means including a pair of threaded members received in said block on opposite sides of said plane to rest against the end of said housing and tilt said block to adjustable position relative to said window, and a closure plate disposed over the open end of said housing and operable to urge said block against said end of said housing.

4. An electromagnetic transducer head assembly for a magnetic recorder or the like comprising a cup-shaped housing having a window to receive a lengthy magnetizable medium, a support block in said housing having a grooved portion for alignment with said window to receive said medium, a head disposed in said block having confronting pole pieces facing said grooved portion, said pole pieces defining an air gap substantially normal to the length of said medium, said housing having a pair of inwardly extending protuberances in a plane substantially perpendicular to the direction of the length of said medium and near the open end thereof, said block having a pair of grooves to receive said protuberances and a pair of outwardly extending protuberances disposed in the plane of said grooves to urge said block against the end of said housing, and means including a pair of threaded members received in said block on opposite sides of said plane to rest against the end of said housing and tilt said block to an adjustable position relative to said window.

5. An electromagnetic transducer head assembly for a magnetic recorder or the like comprising a cup-shaped cylindrical housing having a window to receive a lengthy magnetizable medium for movements in a plane parallel to the axis of said housing, a cylindrical support block in said housing and having a flattened portion for alignment with said window to receive said medium, a head disposed in said block and having confronting pole pieces facing said flattened portion to bear against said medium as it travels therethrough, said pole pieces defining an air gap substantially parallel to the axis of said block, said housing having a pair of inwardly extending protuberances located along a line perpendicular to the axis of said cylinder and the direction of movement of said medium, and near the open end thereof, said block having a pair of grooves to receive said protuberances, said grooves extending in direction parallel to the axis of said cylinder, a closure plate for said housing having a pair of inwardly extending protuberances in the plane defined by said grooves of said block, and means including a pair of members in threaded engagement with the end of said block and located on opposite sides of the plane defined by said grooves and bearing against the end of said housing adjustably to tilt said air gap relative to the axis of said housing and the direction of motion of said medium.

6. An electromagnetic transducer head assembly for a magnetic recorder or the like comprising a cup-shaped cylindrical housing of metal having high permeability at low flux density having a rectangular window to receive a lengthy magnetizable medium for movements in a plane parallel to the axis of said housing, a cylindrical support block in said housing having a flattened portion for alignment with said window to receive said medium, a head disposed in said block and having confronting pole pieces facing said flattened portions to bear against said medium as it travels therethrough, said pole pieces defining an air gap substantially parallel to the axis of said block, said block further having a plurality of prongs extending through the open end of said housing to be received in a socket, electrical conductors connecting said head to said prongs, said housing having a pair of inwardly extending protuberances located along a line perpendicular to the axis of said cylinder and the direction of movement of said medium, and near the open end of said housing, said block having a pair of grooves to receive said protuberances, said grooves extending in direction parallel to the axis of said cylinder, a closure plate of metal having a high permeability at low flux density for said housing and having a pair of inwardly extending protuberances in a plane defined by said grooves of said block and a plurality of openings to receive said prongs, and a pair of screws in threaded engagement with the end of said block and located on opposite sides of the plane defined by said grooves and bearing against the end of said housing adjustably to tilt said air gap relative to the axis of said housing and the direction of motion of said medium, said closure plate having openings in alignment with the ends of said screws to receive an adjusting tool to rotate said screws for adjusting the position of said block.

ROBERT A. VON BEHREN.

REFERENCES CITED

The following references are of record in the file of this patent:

UNITED STATES PATENTS

| Number | Name | Date |
|---|---|---|
| 2,270,320 | Liguori | Jan. 20, 1942 |
| 2,413,108 | Latchford | Dec. 24, 1946 |
| 2,493,742 | Begun | Jan. 10, 1950 |

FOREIGN PATENTS

| Number | Country | Date |
|---|---|---|
| 221,638 | Switzerland | Sept. 1, 1942 |
| 676,810 | Germany | June 12, 1939 |
| 725,830 | Germany | Sept. 30, 1942 |

OTHER REFERENCES

Head Alignment, Audio Engineering, January 1949, page 12.